(12) United States Patent
Murphy et al.

(10) Patent No.: US 11,163,067 B2
(45) Date of Patent: Nov. 2, 2021

(54) INTERFACE DEVICE AND METHOD FOR RETROFITTING AN AIRPLANE WITH GNSS LANDING CAPABILITY

(71) Applicant: The Boeing Company, Chicago, IL (US)

(72) Inventors: Timothy Allen Murphy, Everett, WA (US); William Matthew Harris, Seattle, WA (US); Janet Suzanne Booth, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 16/838,990

(22) Filed: Apr. 2, 2020

(65) Prior Publication Data
US 2021/0311200 A1    Oct. 7, 2021

(51) Int. Cl.
| | | |
|---|---|---|
| G01S 19/15 | (2010.01) | |
| G01S 19/07 | (2010.01) | |
| G01S 19/41 | (2010.01) | |

(52) U.S. Cl.
CPC ............ *G01S 19/15* (2013.01); *G01S 19/071* (2019.08); *G01S 19/41* (2013.01)

(58) Field of Classification Search
CPC ......... G01S 19/15; G01S 19/071; G01S 19/41
USPC .......................................... 342/357.24, 442
See application file for complete search history.

(56) References Cited

U.S. PATENT DOCUMENTS

| | | | |
|---|---|---|---|
| 7,460,029 B2 | 12/2008 | Boorman et al. | |
| 8,818,582 B2 * | 8/2014 | Neri ........................ | G01S 19/15 |
| | | | 701/16 |
| 9,159,241 B1 * | 10/2015 | Murphy .................. | G01S 1/045 |
| 9,257,050 B2 * | 2/2016 | Fleiger-Holmes ...... | G01S 19/15 |
| 9,395,446 B2 * | 7/2016 | Rollet ..................... | G01S 19/15 |
| 9,830,828 B2 * | 11/2017 | Nicholls ................. | G01S 19/15 |

* cited by examiner

*Primary Examiner* — Bo Fan
(74) *Attorney, Agent, or Firm* — Ostrager Chong Flaherty & Broitman P.C.

(57) ABSTRACT

An interface device that enables a GNSS-based precision approach through the Ground Base Augmentation System (GBAS) function known as the GNSS Landing System (GLS) and/or through Satellite Based Augmentation Systems (SBAS) based Localizer Performance with Vertical Guidance (LPV). The GLS interface device allows a GLS-capable multi-mode receiver to be used on a non-GLS-capable airplane without extensive changes to other airplane systems. The GLS interface device works by intercepting information to and from the multi-mode receiver and modifying the information to make the interface compatible with an airplane that uses ILS guidance. Similarly, the information modifications will make the airplane appear to the multi-mode receiver as if it were a GLS-capable airplane.

20 Claims, 4 Drawing Sheets

INTERFACE DEVICE AND METHOD FOR RETROFITTING AN AIRPLANE WITH GNSS LANDING CAPABILITY

BACKGROUND

This disclosure generally relates to navigation systems used in the aviation industry and, in particular, relates to the positioning and landing system based on a global navigation satellite system.

As used herein, the term "global navigation satellite system" (GNSS) includes any satellite system(s) or combination thereof for determining position (e.g., the Global Positioning System (GPS), Galileo, Beidou, Globalnaya Navigazionnaya Sputnikovaya Sistema (GLONASS), etc.). A GNSS provides geolocation and time information to a GNSS receiver anywhere on or near the Earth where there is an unobstructed line of sight to four or more GNSS satellites. For the purpose of illustration, embodiments will be described below which employ GPS signals.

Many airplanes are equipped with an automated landing system that controls the airplane during landing. Automated landing systems have become increasingly more common and are frequently relied on for both instrument landings under instrument flight rules (IFR) and landings performed under visual flight rules (VFR). Known automated landing systems utilize various receivers (such as multi-mode receivers) to receive guidance signals transmitted from the ground. The guidance signals inform the airplane of its position relative to a desired vertical and lateral path to the runway and through roll-out after touchdown.

Currently, a GNSS-based precision approach is possible through the Ground Based Augmentation System (GBAS) function known as the GBAS Landing System (GLS) as well as through the Satellite Based Augmentation System (SBAS) function known as Localizer Performance with Vertical guidance (LPV). The GLS and LPV functions integrate satellite and ground-based navigation information required for approach and landing guidance. Potential benefits of GLS or LPV capabilities include significantly improved takeoff and landing capability at airports worldwide and at reduced cost, improved instrument approach service at additional airports and runways, and the eventual replacement of the Instrument Landing System (ILS).

The GLS and LPV are currently implemented fully on newer airplanes (hereinafter "GLS-capable airplanes"). However, to integrate these functions into a legacy ILS-capable airplane (hereinafter "non-GLS-capable airplane") typically requires changes be made to many other systems, including displays and flight management. The classic solution to the problem of putting GLS and LPV capability on a non-GLS-capable airplane is a full integration which would require modifications to displays, autopilot, flight management computer, displays, Ground Proximity Warning System, and potentially other systems (e.g., Flight Data Recorder, maintenance systems, etc.). In many cases, modification of those older systems would be very expensive if not impossible.

The prohibitive cost of retrofitting airplanes to provide GLS and/or LPV capability is a problem for some airline operators because they cannot fully achieve the benefits of GLS and/or LPV unless the functionality is available on most if not all of their fleets. GLS and LPV technology could be a benefit both in terms of increased safety and increased operational efficiency. Thus, there is a need for methods, systems, and apparatus that address the aforementioned challenges as well as enable the proliferation of GNSS-based precision approach capabilities on all airplanes.

SUMMARY

The subject matter disclosed in some detail below is directed to systems, methods, and interface devices for enabling GLS capability to be retrofit to out-of-production airplanes in an affordable manner (hereinafter "GLS interface device"). A system may include multiple GLS interface devices in the form of multiple interface units configured as Line Replaceable Units (LRUs). Each GLS interface device (abbreviated to "GID" in some instances below) works by intercepting information to and from a GLS-capable multi-mode receiver and modifying the information to make the interface compatible with an airplane that uses ILS guidance. Similarly, the information modifications will make the airplane appear to a GLS-capable multi-mode receiver as if it were a GLS-capable airplane. Such a retrofit will enable legacy airplanes to fly GNSS-based precision approaches (GLS or LPV) at a fraction of the cost of a traditional airplane integration, allowing a solution for airplanes that otherwise would not justify the cost. The GLS interface device does not remap ILS frequencies and is an entirely self-contained function in an external box, which avoids the need to produce a special (expensive) version of the multi-mode receiver. Each GLS interface device is configured to enable a standard third-generation GLS-capable multi-mode receiver to be employed on a non-GLS-capable airplane.

In accordance with one embodiment, the GLS interface device proposed herein—when installed onboard a non-GLS-capable airplane along with a GLS-capable multi-mode receiver—serves as a tuning panel which a pilot may use for selection of GLS and LPV approaches. The GLS interface device is situated between a GLS-capable multi-mode receiver and the rest of the airplane systems. When the GLS interface device is in the ILS mode, the device will operate all interfaces as designed for ILS without modification. In contrast, when the GLS interface device is in the GLS mode, the device will modify interface data where necessary to operate GLS as a precision approach function identically to ILS, replacing and modifying the data payload associated with specific data type identifiers (e.g., ARINC 429 labels) as necessary to enable the GLS/LPV functionality. When the GLS mode is enabled, the GLS interface device will take the channel from the tuning input and pass it on to the GLS-capable multi-mode receiver. The multi-mode receiver will have full GLS and LPV capability, so the multi-mode receiver will then tune the approach and provide deviations that are in the same format (e.g., ARINC 429 word format) as existing ILS deviation data word format. The GLS interface device will also provide direct feedback to the pilots regarding which approach is tuned and flown and the identifier of the selected approach. Outputs from the distance measuring equipment (DME) are also routed through the GLS interface device so that when in GLS mode, the DME distance data used by existing airplane systems for precision approach reflect the GLS-derived distance to the runway threshold. In this way, the appropriate distance to the runway threshold is displayed in the cockpit where the DME distance would normally be shown for an ILS approach.

Although various embodiments of systems, methods, and devices for enabling GLS capability onboard an ILS-capable airplane will be described in some detail below, one or more of those embodiments may be characterized by one or more of the following aspects.

One aspect of the subject matter disclosed in detail below is a system for providing GLS-based position guidance to an airplane pilot during a runway approach, the system comprising: a GLS interface device comprising a processor; a GLS-capable multi-mode receiver communicatively coupled to the GLS interface device, wherein the GLS-capable multi-mode receiver is configured to output ILS deviation data words containing ILS deviation data and an ILS data type identifier in an ILS mode and output GLS deviation data words containing GLS deviation data and a GLS data type identifier in a GLS mode; an ILS-capable flight management system communicatively coupled to the GLS interface device; and a display device communicatively coupled to the GLS interface device, wherein the processor of the GLS interface device is configured in a GLS mode to change the GLS data type identifier in GLS deviation data words received from the GLS-capable multi-mode receiver to be the ILS data type identifier. The processor of the GLS interface device is further configured to output GLS deviation data words identified by the ILS data type identifier.

In accordance with one embodiment of the method described in the immediately preceding paragraph, the display device is configured to display visual guidance in an ILS deviation format based on GLS deviation data contained in GLS deviation data words identified by the ILS data type identifier received from the GLS interface device. The system may further comprise a DME communicatively coupled to the GLS interface device and configured to output DME distance data words containing DME distance data derived by timing a propagation delay of radio signals and a DME data type identifier. The processor of the GLS interface device is further configured in the GLS mode to change a GLS data type identifier in GLS distance data words received from the GLS-capable multi-mode receiver to be the DME data type identifier.

Another aspect of the subject matter disclosed in detail below is a method for retrofitting an ILS-capable airplane with GLS capability, comprising: disconnecting an ILS-capable multi-mode receiver from an ILS-capable avionics system onboard an airplane; connecting a GLS interface device to the ILS-capable avionics system; and connecting a GLS-capable multi-mode receiver to the GLS interface device, wherein a processor of the GLS interface device is configured in a GLS mode to change a GLS data type identifier in GLS deviation data words received from a GLS-capable multi-mode receiver to be a ILS data type identifier.

A further aspect of the subject matter disclosed in detail below is a method for providing GLS-based position guidance to an airplane pilot during a runway approach, the method comprising: (a) using the GLS to measure a deviation of a position of the airplane relative to a runway during the approach; (b) outputting GLS deviation data words containing a GLS data type identifier and GLS deviation data representing a GLS-measured deviation; (c) changing the GLS data type identifier in the GLS deviation data words to be an ILS data type identifier; and (d) sending the GLS deviation data words containing the ILS data type identifier to an ILS-capable avionics system. The method may further comprise: (e) outputting GLS distance data words containing a GLS data type identifier and GLS distance data representing a GLS-measured distance; and (f) changing the GLS data type identifier in the GLS distance data words to be a DME data type identifier.

Yet another aspect of the subject matter disclosed in detail below is a GLS interface device comprising: first and second input terminals; first through fourth operating contact terminals; a transceiver connected to the first and second operating terminals; a bridge wire that connects the third operating contact terminal to the fourth operating contact terminal; a first relay connected to the first input terminal and having a first switch state in which the first relay connects the first input terminal to the first operating contact terminal and a second switch state in which the first relay connects the first input terminal to the third operating contact terminal; and a second relay connected to the second input terminal and having a first switch state in which the second relay connects the second input terminal to the second operating contact terminal and a second switch state in which the second relay connects the second input terminal to the fourth operating contact terminal, wherein the processor is connected to and configured to control the first and second relays to connect the first and second input terminals to the first and second operating terminals respectively in a GLS mode and to connect the first and second input terminals to the third and fourth operating terminals respectively in an ILS mode. The processor is further connected to the transceiver and further configured to replace data payload identifiers in avionics data received from the transceiver as appropriate in both directions in the GLS mode and not replace the data payload identifiers in the avionics data in the ILS mode. The processor of the GLS interface device is configured in a GLS mode to receive a GLS deviation data word and change a GLS data type identifier in the GLS deviation data word to be an ILS data type identifier.

Other aspects of systems, methods, and devices for enabling GLS capability onboard an ILS-capable airplane are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 2 shows a single interface unit. However, it should be appreciated that the system may include multiple interface units, such as multiple LRUs configured to perform the interfacing functions disclosed herein.

Reference will hereinafter be made to the drawings in which similar elements in different drawings bear the same reference numerals.

DETAILED DESCRIPTION

Example implementations of systems, methods, and devices for enabling GLS capability onboard an ILS-capable airplane are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The example implementations described below may involve the execution of computer-executable instructions, such as routines executed by a programmable computer. Those skilled in the relevant art will appreciate that the positioning and landing system disclosed herein may be implemented using other computer system configurations. For example, at least some of the data processing functions disclosed herein may be embodied in a special-purpose computer or data processor that is specifically programmed, configured, or constructed to perform one or more computer-executable instructions. Accordingly, the term "computer" as generally used herein refers to any data processor that can be engaged in a cockpit, including computers for navigation radios such as multi-mode receivers, ILS receivers, cockpit display systems, flight management computers, flight control computers, electronic flight bags, laptops, tablet computers, or other hand-held devices.

The general architecture and components of a typical flight control system in which the innovative technology proposed herein may be incorporated have been described in some detail in U.S. Pat. No. 7,460,029 and that description will not be repeated here. In particular, U.S. Pat. No. 7,460,029 includes drawings which illustrate aspects of: a flight deck of an aircraft having a flight management system (FIG. 1A); an aircraft having a flight guidance system (FIG. 2A); a flight deck having a flight guidance system with displays and controls (FIG. 2B); and in a general manner, the operation of a flight guidance system (FIG. 3). FIGS. 1A, 2A, 2B, and 3 and their associated descriptions in U.S. Pat. No. 7,460,029 are incorporated by reference herein in their entireties.

Many airplanes are equipped with an automated landing system that controls the airplane during landing. Known automated landing systems utilize various receivers (such as multi-mode receivers) to receive guidance signals transmitted from the ground. Such guidance signals may include, for example, ILS signals, GLS signals, and/or microwave landing system (MLS) signals. The guidance signals inform the airplane of its position relative to a desired vertical and lateral path to the runway and through roll-out after touchdown. The desired vertical path is referred to as the glideslope and the lateral path is referred to as the localizer. The glideslope is typically defined as a 3-degree descent with a desired intercept with the ground at 1000 feet beyond the runway threshold. The localizer guides the airplane to the runway centerline.

In some automated landing systems, the guidance signals transmitted from the ground are received by on-board antennae and routed to redundant multi-mode receivers. Each multi-mode receiver computes a localizer deviation and a glideslope deviation which are routed to a flight control module that includes the automated landing system. The localizer deviation is an indication of the airplane's position relative to the desired path to the runway centerline. For example, the localizer deviation may indicate the airplane is approximately 2 degrees left of the runway centerline. The glideslope deviation is an indication of the airplane's position relative to the target glideslope to the runway. For example, the glideslope deviation may indicate the airplane is 1 degree below the target glideslope. The automated landing system uses the localizer deviation and glideslope deviation to command the engines and control surfaces of the airplane.

A typical ILS-capable airplane also includes distance measuring equipment (DME), which is a radio navigation technology that measures the slant range (distance) between an aircraft and a ground station by timing the propagation delay of radio signals. Line-of-sight visibility between the aircraft and ground station is required. An interrogator (airborne) initiates an exchange by transmitting a pulse pair, on an assigned channel, to the transponder ground station. The channel assignment specifies the carrier frequency and the spacing between the pulses. After a known delay, the transponder replies by transmitting a pulse pair on a frequency that is offset from the interrogation frequency and has specified separation.

Many legacy airplanes utilize the ILS and DME and are not equipped to use the GLS. As well known to persons skilled in the art, the ILS ground portion includes: (1) a localizer antenna centered on the runway providing lateral guidance; (2) a glide slope antenna near the runway threshold providing vertical guidance; and (3) marker beacons providing distance to the runway threshold function. In addition, the onboard portion of an ILS includes the guidance display provided to the pilots such as, but not limited to, indications that the airplane is to the left or right of the centerline, above or below the glide slope, or on the runway centerline and on the glideslope, etc. Such visual guidance is indicated on cockpit displays such as a primary flight display, a navigation Display, a head-up display, a multi-function display, a crew alerting display, and an electronic flight bag display.

For example, when the flight crew is executing a manual or automatic landing, the flight crew may engage the ILS portion of a multi-mode receiver to receive radiated signals from the localizer and glide slope antennas on the ground. The received signals are used to determine the airplane's position relative to the runway centerline in azimuth and relative to a typical 3-degree descent path in elevation. Accordingly, the multi-mode receiver is capable of providing to the primary flight display, the flight guidance system, and the automatic landing portion of the autopilot indicators and/or signals corresponding to elevation and azimuth deviations that may be visually or aurally presented or annunciated to provide guidance to the pilots for manual landing and/or to the autopilot for automatic landing.

In contrast, the GLS consists of three major elements—a global satellite constellation that supports worldwide navigation position fixing, a GBAS facility at each equipped airport that provides local navigation satellite correction signals via a datalink, and avionics in each airplane that process and provide guidance and control based on the satellite and GBAS signals. The GLS uses a navigation satellite constellation (e.g., the U.S. Global Positioning System (GPS)) for the basic positioning service. The basic positioning service is augmented locally—at or near the airport—through a GBAS radio transmitter facility. Because the ground facility is located at a known surveyed point, the GBAS can estimate the errors contained in the basic positioning data.

Many airplanes are equipped with multi-mode receivers that support the ILS and basic GPS operations, but do not support GLS (hereinafter "non-GLS-capable airplanes"). These ILS-capable multi-mode receivers can be modified to support GLS. The GLS capability is supported through the addition of a receiver and processing in the multi-mode receivers of the GBAS data provided through the data link. The GLS-capable multi-mode receivers apply the local correction data received from the GBAS to each satellite that the airplane and GBAS share in common.

A single GBAS ground station typically provides approach and landing service to all runways at the airport where it is installed. Each runway approach direction requires the definition of a final approach segment (FAS) to establish the desired reference path for an approach, landing, and rollout. The FAS data for each approach are determined by the GBAS service provider and typically are verified after installation of the GBAS ground station. Unlike the ILS, the GLS has the potential for multiple final approach paths, glideslope angles, and missed approach paths for a given runway. Each approach is given a unique identifier for a particular FAS, glideslope, and missed approach combination. FAS data for all approaches supported by the particular GBAS facility are transmitted to the airplane through the same high-integrity data link as the satellite range correction data. The multi-mode receivers process the pseudo-range correction and FAS data to produce an ILS-like deviation indication from the final approach path. These deviations are then displayed on the pilot's flight instruments (e.g., primary flight display) and are used by airplane systems such as the flight guidance system (e.g., autopilot and flight director) for landing guidance. The scaling of the path deviation information on the pilot's displays for a GLS approach can be equivalent to that provided for an ILS approach. Hence, the pilot can monitor a GLS approach by using a display that is equivalent to that used during an ILS approach.

To prepare for a GLS approach, the pilot selects GLS as the navigation source and chooses the particular approach to be flown. This is accomplished by selecting a GLS approach through the flight management system (FMS) or by entering an approach designator on a dedicated navigation control panel (hereinafter "tuning panel") which tunes the navigation receiver to a particular broadcast signal. In either case, a unique five-digit channel number is associated with each approach. With the FMS interface, the pilot does not need to enter a channel number; tuning is accomplished automatically based on the approach selected, just as is done for ILS. However, for an airplane equipped with separate navigation tuning panels, the pilot tunes the multi-mode receivers by entering a GLS channel number in that panel.

The innovative technology proposed in this disclosure employs one or more GLS interface devices, which may be embodied as separate interface units, such as LRUs. Each GLS interface device is configured to enable a GLS-capable multi-mode receiver to be used on an ILS-capable airplane without extensive changes to other airplane systems. A GLS interface device works by intercepting information to and from a GLS-capable multi-mode receiver and modifying the information to make the interface compatible with an airplane that uses ILS guidance. Similarly, the information modifications will make the ILS-capable airplane appear to a GLS-capable multi-mode receiver as if it were a GLS-capable airplane.

Figure 1:
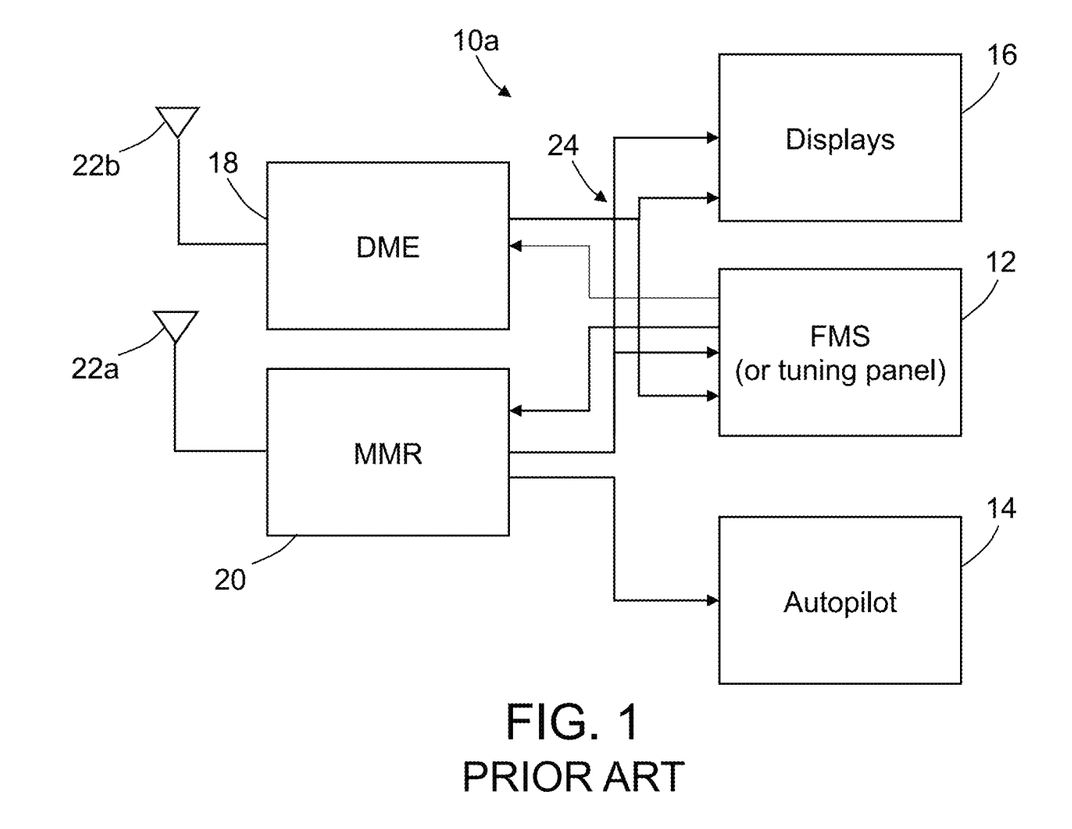
FIG. 1 is a functional diagram showing a typical airplane architecture for an ILS-based position and landing system onboard an airplane.

FIG. 1 is a functional diagram showing a typical airplane architecture for an ILS-based position and landing system 10a onboard a non-GLS-capable airplane. The ILS-based position and landing system 10a includes a flight management system 12 (hereinafter "FMS 12"), an autopilot 14, cockpit displays 16, distance measuring equipment 18 (hereinafter "DME 18"), and a multi-mode receiver 20 (hereinafter "MMR 20"), each of which includes one or more processors or computers for performing their respective data processing functions. The ILS-based position and landing system 10a may include multiple MMRs. The MMR 20 is connected to at least one antenna 22a; the DME 18 is connected to another antenna 22b. Both the DME 18 and the MMR 20 are tuned to receive respective selected frequencies. In accordance with some embodiments, DME 18 and MMR 20 are tuned automatically by the FMS 12 in response to pilot inputs. In alternative embodiments, a separate tuning panel may be provided, which tuning panel has devices such as knobs and buttons that enable a pilot to input a selected receive frequency channel, e.g., a selected ILS frequency channel.

The ILS-based position and landing system 10a partly represented in FIG. 1 further includes an avionics digital information transfer system 24 consisting of two-wire data buses. The respective processors or computers of the data processing units identified in FIG. 1 are communicatively coupled by means of the avionics digital information transfer system 24. Each of the data processing units depicted in FIG. 1 includes one or more transceivers communicatively coupled to the avionics digital information transfer system 24 for enabling intercommunication between the units. As seen in FIG. 1, MMR 20 is communicatively coupled to send data to FMS 12, autopilot 14, and cockpit displays 16 and receive data from FMS 12; DME 18 is communicatively coupled to send data to FMS 12 and cockpit displays 16 and receive data from FMS 12.

The system partly depicted in FIG. 1 has typical inter-wiring for an ILS-capable airplane. Those skilled in the relevant art understand how the configuration of FIG. 1 is implemented and functions, and thus a detailed discussion of FIG. 1 is not required. For example, most large commercial airplane manufacturers offer one or more airplane types with systems configured substantially similarly to that of FIG. 1. Those skilled in the relevant art will also appreciate that neither all the systems nor all the inter-wiring between the relevant systems are shown. In this instance, while power connections, switches, and system redundancies are not shown, those skilled in the art can extend the basic architecture shown in FIG. 1 to apply it to a particular airplane installation, for example, with left/right/center MMRs, autopilots, an inertial navigation system, and the like.

The avionics digital information transfer system 24 depicted in FIG. 1 may be configured in accordance with the ARINC 429 data transfer standard, which defines the physical and electrical interfaces of a two-wire data bus and a data protocol to support an airplane's avionics local area network. The ARINC 429 unit of transmission is a fixed-length 32-bit frame, which the standard refers to as a "word". Each word includes an 8-bit label that identifies the data type. More specifically, the ARINC 429 word format is as follows: Bit 32 is the parity bit and is used to verify that the word was not damaged or garbled during transmission; Bits 30 and 31 are the Sign/Status Matrix; Bits 11-29 contain the data; Bits 9 and 10 are Source/Destination Identifiers; and Bits 1-8 contain a label identifying the data type. For example, the Label 033 identifies the data type "ILS Frequency". When the systems of an ILS-capable airplane receive ARINC 429 words labeled 033, those systems recognize that the data payload in those words includes digital numbers representing the ILS deviations measured during the ILS landing.

Figure 2:
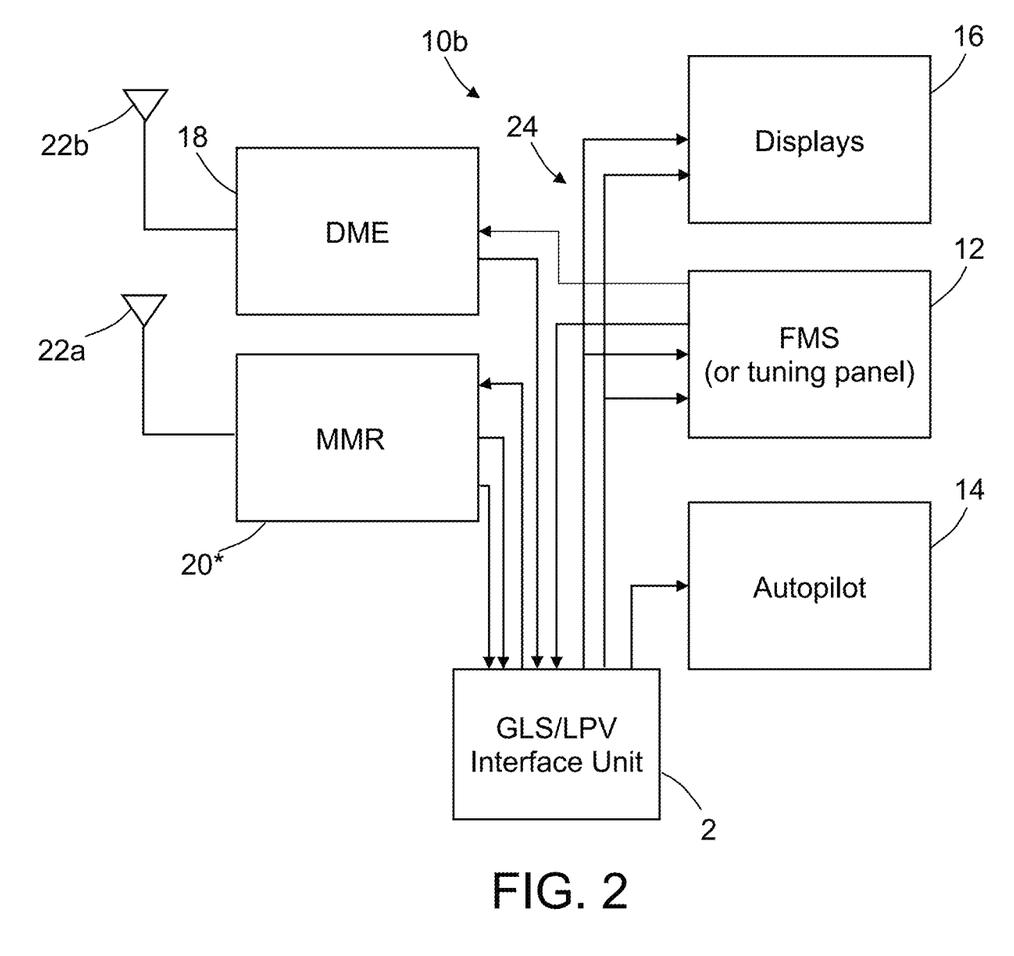
FIG. 2 is a functional diagram showing an airplane architecture for a modified airplane having an ILS-based position and landing system supplemented with GLS and LPV capabilities in accordance with one embodiment. For the sake of simplicity.

FIG. 2 is a functional diagram showing a modified airplane architecture for a position and landing system 10b having both GLS and ILS landing capabilities in accordance with one embodiment. The position and landing system 10b includes a FMS 12, an autopilot 14, cockpit displays 16, DME 18, and a GLS-capable multi-mode receiver 20\* (hereinafter "GLS-capable MMR 20\*"), each of which includes one or more processors or computers for performing their respective data processing functions. The structures and functions of FMS 12, autopilot 14, cockpit displays 16, and DME 18 may be the same as those described above for the identically identified components depicted in FIG. 1. However, their interconnections differ somewhat, as will be described in some detail below. In accordance with one proposed implementation, the GLS-capable MMR 20\* is a wireless receiver having GNSS capabilities in addition to ILS capabilities. For example, the GLS-capable MMR 20\* may be a fully digital, so-called "third-generation" (3G) integrated navigation receiver that integrates ILS, GPS, GLS, and VHF omnidirectional radio range (VOR) functionality into a single receiver.

The position and landing system 10*b* partly represented in FIG. 2 includes a GLS-capable MMR 20\* and a GLS interface device 2 (also referred to herein as "GLS/LPV interface unit" because it also includes LPV capability). Although FIG. 2 shows a single GLS interface device 2, the position and landing system 10*b* may include multiple interface units, such as multiple LRUs configured to perform the interfacing functions disclosed herein. The GLS-capable MMR 20\* and GLS interface device 2 are communicatively coupled via an avionics digital information transfer system 24 which is configured in accordance with the ARINC 429 technical standard (has ARINC 429 two-wire busses), but is connected differently than the system depicted in FIG. 1. More specifically, four ARINC 429 busses are routed through the GLS interface device 2. For example, as seen in FIG. 2, the GLS-capable MMR 20\* is: (a) communicatively coupled to send data to the GLS interface device 2, not directly to FMS 12, autopilot 14, or cockpit displays 16; and (b) communicatively coupled to receive data from the FMS 12 via the GLS interface device 2, not directly from the FMS 12. In addition, DME 18 is communicatively coupled to send data to the GLS interface device 2, not directly to FMS 12 or cockpit displays 16.

The illustrative embodiment of the GLS interface device 2 includes a tuning panel which a pilot may use for GLS and LPV approaches. Although FIG. 2 shows a GLS interface device 2 with an approach selection function or tuning panel integrated into a single device, these functions could be packaged in separate units and multiple LRUs configured to perform the interfacing functions disclosed herein. The GLS interface device 2 is situated between the GLS-capable MMR 20\* and the rest of the airplane systems. The GLS interface device 2 includes a processor (not shown in FIG. 2, but see processor 4 in FIG. 3) which modifies incoming data when the GLS interface device 2 is in the GLS mode. In contrast, when the GLS interface device 2 is in the ILS mode, the ports for incoming and outgoing data are directly connected so that the data flow bypasses the processor 4. In other words, the ARINC 429 data received by the GLS interface device 2 is not modified by the processor 4 when the GLS interface device 2 is in the ILS mode. Instead the ARINC 429 data is routed through the GLS interface device 2 by closing switches that connect ARINC 429 data busses. As a result, all ILS deviation data words which bypass the processor 4 arrive at their destinations without modifications.

When the GLS interface device 2 is in the GLS mode, the device intercepts data in both directions, replacing and modifying the data payload associated with specific labels as necessary to enable the GLS/LPV functionality. The GLS interface device 2 presents to the GLS-capable MMR 20\* as if it is in the GLS or LPV mode; the GLS interface device 2 presents to all other airplane systems as if it is in the ILS mode. In other words, the GLS interface device 2 that enables the ILS-capable airplane systems to utilize positioning data provided by the GLS-capable MMR 20\* by disguising the GLS positioning data words with ILS labels.

More specifically, when the GLS mode is enabled, the GLS interface device 2 will take the channel from the FMS 12 and pass it on to the GLS-capable MMR 20\*. The GLS-capable MMR 20\* has full GLS and LPV capability, so GLS-capable MMR 20\* will then tune the approach and provide deviations that are in the same format (e.g., ARINC 429 word format) as existing ILS deviation data word format. In this illustrative embodiment, the GLS interface device 2 will also provide direct feedback to the pilots regarding which approach is tuned and flown and the identifier of the selected approach. Without loss of generality, these display functions could be packaged in other units. Outputs from DME 18 are also routed through GLS interface device 2 so that when in GLS mode, the DME distance is replaced with the GLS-derived distance to the runway threshold. In this way, the appropriate distance to the runway threshold is presented in the cockpit displays 16 where the DME distance would normally be shown for an ILS approach.

For example, when the flight crew is executing a manual or automatic landing, the flight crew may receive data from the ILS portion of the GLS-capable MMR 20\*, which data was derived from radiated signals from the localizer and glide slope antennas on the ground and represents the airplane's position relative to the runway centerline in azimuth and relative to a typical 3-degree descent path in elevation. Accordingly, the GLS interface device 2 is capable of providing to the FMS 12, displays 16, and the automatic landing portion of the autopilot 14, indicators and/or signals corresponding to elevation and azimuth deviations that may be provided as guidance to the pilots for manual landing and/or to the autopilot for automatic landing up to and including touchdown and rollout.

Alternatively, in either the GLS or LPV case, the GLS-capable MMR 20\*—based on knowledge of the airplane's position and the selected channel number—will produce lateral and vertical deviations to be used by the autopilot 14 or flight director. The displayed guidance indicators for both cases will look just like ILS deviations on cockpit displays that are provided for ILS approaches. Thus, the GLS interface device 2 makes it possible for a flight crew to execute the approach and landing for a GLS or LPV case in the same manner as they would for the ILS approach and landing.

Turning now to the processing of distance to the approach runway, in accordance with one embodiment, the system proposed herein is capable of processing the distance to a runway facility (e.g., the distance to a DME antenna near a localizer antenna of the runway facility or a distance to the threshold of the runway facility for the precision approach). Accordingly, the GLS-capable MMR 20\* is configured to produce a DME signal output that corresponds to the distance to the threshold information that is normally produced during a GLS operation.

In accordance with the position and landing system 10*b* partly represented in FIG. 2, when the pilot's frequency selection results in selection of the ILS mode, all the distance information (e.g., ARINC labels) from the DME 18 are passed through the GLS interface device 2 undisturbed; i.e., the GLS-capable multi-mode receiver function is effectively switched out of the signal path. However, if the pilot selects a GLS approach (channel number), then the GLS interface device 2 will produce a DME distance label containing the GLS-computed distance in order to match the label normally expected by the other avionics systems during an ILS approach (i.e. the DME label). Those avionics systems then treat the appropriate range/distance computed for the GLS approach as being the distance for an ILS approach (i.e. the DME distance). Since the avionics systems of the ILS-capable airplane do not know the difference between the ILS distance data or GLS distance data provided by the GLS interface device 2 (because the label is the same in either case), the ILS-capable avionics systems are augmented with GLS capability.

In accordance with the ARINC 429 standards, the data output by the DME 18 should be organized such that each word bearing Label 035 (indicating parameter "DME frequency") is followed by the distance words (e.g., labels 201 and 202). This enables DME 18 downstream equipment to correlate distance and frequency. Therefore, in the GLS mode the GLS interface device 2 need only replace the data payloads of Labels 201 and 202 that follow label 035 and correspond to the DME 18 tuning for the approach. All the other words from the DME pass by unmodified. Thus, the measured distance to a runway facility may be a distance to a DME antenna near a localizer antenna of the runway facility or a distance to the threshold of the runway facility for the precision approach, depending on the mode selected by the pilot using the GLS interface device 2.

Figure 3:
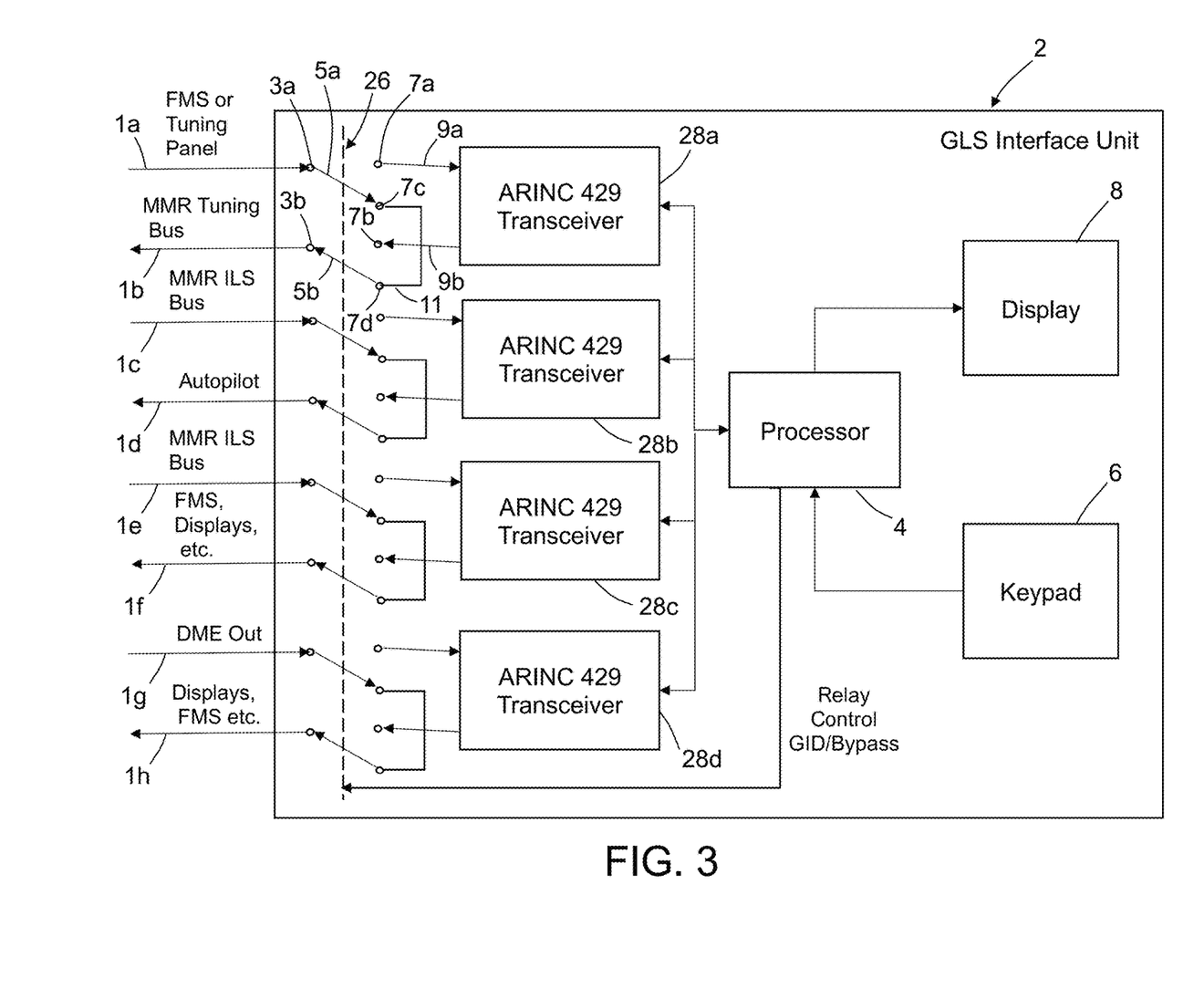
FIG. 3 is a functional diagram for an example implementation of a GLS interface device.

FIG. 3 is a functional diagram identifying some components of a GLS interface device 2 in accordance with one example implementation. The GLS interface device 2 partly depicted in FIG. 3 includes four ARINC 429 transceivers 28a-28d. In other implementations, the number of ARINC 429 transceivers may be different than four. The GLS interface device 2 further includes a processor 4, a keypad 6, and a display screen 8. The processor 4 is communicatively coupled (e.g., by electrical wires) to the keypad 6, display screen 8, and ARINC 429 transceivers 28a-28d. Other input devices, such as a physical switch and soft switches, are not shown in FIG. 3, but will be described below with reference to FIG. 4.

Still referring to FIG. 3, the GLS interface device 2 further includes a mode switch array 26 consisting of a multiplicity of pairs of switches (for example, relays), one pair of switches for each of the four ARINC 429 transceivers 28a-28d. Each switch of mode switch array 26 is switchable between either of two switch states: a Bypass switch state (which invokes the ILS mode) and a GID switch state (which invokes the GLS mode). (As previously mentioned, GID is an abbreviation for "GLS interface device"). All of the switches of mode switch array 26 change state in unison in response to a control signal from the processor 4.

When all of the switches are in the ILS switch state as depicted in FIG. 3, the paired external wires of the ARIND 429 data busses are connected to each other, thereby bypassing the transceivers. More specifically, the external wire 1a (which carries a signal from the FMS or tuning panel) is connected to external wire 1b (which carries a signal to the MMR tuning bus); the external wire 1c (which carries a signal from the MMR ILS bus) is connected to external wire 1d (which carries a signal to the autopilot); the external wire 1e (which carries a signal from the MMR ILS bus) is connected to external wire 1f (which carries a signal to the FMS and displays); and the external wire 1g (which carries a signal from the DME is connected to external wire 1h (which carries a signal to the FMS and displays autopilot).

Conversely, when all of the switches of mode switch array 26 are in the GID switch state (not shown in FIG. 3), the external wires of the ARIND 429 data busses are connected to the ARINC 429 transceivers 28a-28d. More specifically, external wires 1a and 1b are connected to ARINC 429 transceiver 28a; external wires 1c and 1d are connected to ARINC 429 transceiver 28b; external wires 1e and 1f are connected to ARINC 429 transceiver 28c; and external wires 1g and 1h are connected to ARINC 429 transceiver 28d. The ARINC 429 transceivers 28a-28d forward signals received via external wires 1a, 1c, 1e, and 1g to the processor 4 and receive return signals from processor 4 which are forwarded to external wires 1b, 1d, 1f, and 1h.

For the purpose of illustration, the operation of one pair of switches 5a and 5b will now be described in detail with reference to FIG. 3. The other pairs of switches depicted in FIG. 3 operate in a similar fashion and in unison with switches 5a and 5b. The arrowheads indicate the directions of data flow.

As seen in FIG. 3, the external wire 1a terminates at an input terminal 3a, whereas the external wire 1b terminates at an output terminal 3b. The switch 5a switchably connects the input terminal 3a to either operating contact terminal 7a or operating contact terminal 7c, whereas switch 5b switchably connects the output terminal 3b to either operating contact terminal 7b or operating contact terminal 7d.

In the Bypass switch state depicted in FIG. 3, the switch 5a connects the input terminal 3a to the operating contact terminal 7c, while the switch 5b connects the output terminal 3b to the operating contact terminal 7d. The operating contact terminals 7c and 7d are connected by a bridge wire 11. Thus, any signal received via external wire 1a will pass directly out external wire 1b when switches 5a and 5b are in the Bypass switch state depicted in FIG. 3.

Conversely, in the GID switch state, the switch 5a connects the input terminal 3a to the operating contact terminal 7a, while the switch 5b connects the output terminal 3b to the operating contact terminal 7b. The operating contact terminal 7a is connected via internal wire 9a to a receive port of ARINC 429 transceiver 28a, whereas the operating contact terminal 7b is connected via internal wire 9b to a transmit port of ARINC 429 transceiver 28a. Thus when switch 5a and 5b are in the GID switch state (not depicted in FIG. 3), any signal received via external wire 1a will be delivered to the processor 4 for processing and then the processor 4 will send the modified signal to external wire 1b via ARINC 429 transceiver 28a.

The automated landing system proposed herein provides only a single ILS-like landing mode to the pilot by masking the GLS mode-specific functionality of the GLS-capable MMR 20\*. Accordingly, the GLS-capable MMR 20\* is capable of producing: (1) deviations that look just like ILS deviations on cockpit displays; and (2) DME signal output that corresponds to the distance to the runway facility that is normally produced during a GLS operation. Consequently, the FMS 12, autopilot 14, displays 16, DME 18, flight data recorder, and other downstream systems will operate as if there were an ILS on the ground providing the guidance.

Figure 4:
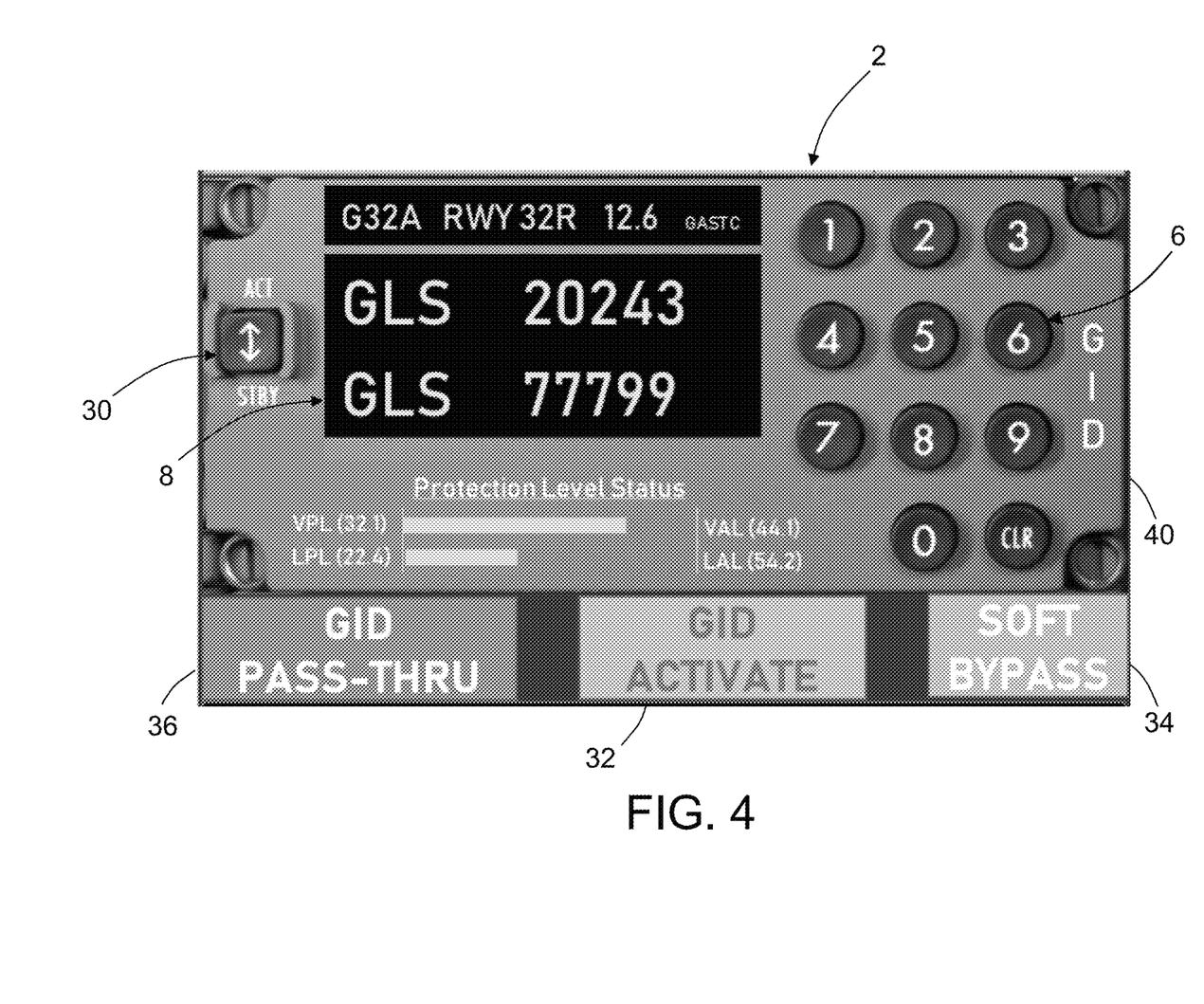
FIG. 4 is a diagram representing a front view of an example implementation of a GLS interface unit.

FIG. 4 is a diagram representing a front view of a GLS interface device 2 in accordance with one possible implementation. The GLS interface device 2 includes a housing 40 that supports a keypad 6, a display screen 8, and a physical switch 30. The housing 40 also supports a touch-sensitive substrate configured to have three touch-sensitive fields (hereinafter "soft switches") which enable the manual selection of one of three modes. The GLS interface device 2 may be activated by touching soft switch 32. The received data bypasses the GLS interface device 2 when soft switch 34 is touched. Received data is passed through the GLS interface device 2 (for factory purposes) when soft switch 36 is touched. The GLS interface device 2 is configured to: (1) allow pilot selection of ILS or GLS/LPV modes; (2) allow the pilot to select specific approaches via channel number; and (3) provide display of approach identifiers for verification in all modes.

The GLS interface device 2 is a means to accomplish GLS and LPV precision approach in an ILS aircraft. When activated, the GLS interface device 2 allows the pilot to enter GLS/LPV channels and send the channel information to the GLS-capable MMR 20*. More specifically, the GLS interface device 2 intercepts tuning from the Aircraft Information Management System (AIMS) or the Control Display Unit (CDU) of the FMS and sends pilot tuning from the user interface instead. When activated, the MMR tuning echo is modified to appear to echo AIMS/CDU tuning. More specifically, the GLS interface device 2 intercepts MMR tuning label and replaces with echo of AIMS/CDU tuning label. When activated, the GLS interface device 2 replaces DME distance with a distance to threshold derived using GLS. More specifically, the GLS interface device 2 intercepts DME distance for ILS and substitutes the GLS-derived distance to threshold from the GLS-capable MMR 20*.

Due to interfacing with critical systems, the GID architecture is redundantly distributed and can be bypassed in accordance with one proposed implementation. The example GLS interface device 2 has the following operational modes: (1) Disconnect; (2) Bypass; (3) Pass-Through; and (4) Active.

In the Disconnect mode, the A429 wiring to the GLS interface device 2 is completely disconnected, and factory wiring is restored by connecting the "To GID" and "From GID" wiring bundle connectors.

In the Bypass mode, the GID relays are closed, connecting "To GID" and "From GID" wiring. The Bypass mode is equivalent to the Disconnect mode if the relays are not stuck in an open position. The default relay state when power is removed or lost is in the Bypass configuration. The physical switch 30 may be used to activate a Hard Bypass mode, whereas the soft switch 34 may be used to activate a Soft Bypass mode. Following a Soft Bypass, the GLS interface device 2 may be re-activated using the soft switch 32. Following a Hard Bypass, the GLS interface device 2 may be re-activated only changing the state of the physical switch 30 from Standby to Active.

In the Pass-Through mode, the A429 data is routed through the GLS interface device 2, but unmodified for factory operation. The A429 data is converted to Ethernet format, then back to A429 data and sent to the original destination.

In the Active mode, the A429 data is routed through the GLS interface device 2 and modified by the processor 2 to achieve GLS/LPV as described above. The user interface is used to change modes and enter GLS/LPV tuning. The user interface displays standby and active tuning as well as some approach block data. The user interface always displays GID mode and status information, regardless of mode.

The GLS interface device disclosed above enables a method for retrofitting an ILS-capable airplane with GLS and/or LPV capability. In accordance with one embodiment, the retrofitting method comprises: disconnecting an ILS-capable multi-mode receiver from an ILS-capable avionics system onboard an airplane; connecting a GLS interface device to the ILS-capable avionics system; and connecting a GLS-capable multi-mode receiver to the GLS interface device.

The innovative system disclosed herein provides GLS-based position guidance to an airplane pilot during a runway approach. In accordance with the embodiment described above, the system comprises: a GLS interface device 2 comprising a processor 4; a GLS-capable MMR 20* communicatively coupled to the GLS interface device 2; an ILS-capable FMS 12 communicatively coupled to the GLS interface device 2; and a display device 16 communicatively coupled to the GLS interface device 2. The processor 4 of the GLS interface device 2 is configured in a GLS mode to change the GLS data type identifier in GLS deviation data words received from the GLS-capable MMR 20* to be the ILS data type identifier. The display device 16 is configured to display visual guidance in an ILS deviation format based on GLS deviation data contained in GLS deviation data words identified by the ILS data type identifier received from the GLS interface device 2. The system may further comprise a DME 18 communicatively coupled to the GLS interface device 2 and configured to output DME distance data words containing DME distance data derived by timing a propagation delay of radio signals and a DME data type identifier. The processor 4 of the GLS interface device 2 is further configured in the GLS mode to change a GLS data type identifier in GLS distance data words received from the GLS-capable MMR 20* to be the DME data type identifier.

The system described herein enables a method for providing GLS-based position guidance to an airplane pilot during a runway approach. In accordance with one embodiment, the method comprises: (a) using the GLS to measure a deviation of a position of the airplane relative to a runway during the approach; (b) outputting GLS deviation data words containing a GLS data type identifier and GLS deviation data representing a GLS-measured deviation; (c) changing the GLS data type identifier in the GLS deviation data words to be an ILS data type identifier; and (d) sending the GLS deviation data words containing the ILS data type identifier to an ILS-capable avionics system. The method may further comprise: (e) outputting GLS distance data words containing a GLS data type identifier and GLS distance data representing a GLS-measured distance; and (f) changing the GLS data type identifier in the GLS distance data words to be a DME data type identifier.

The embodiments disclosed above use one or more processing or computing devices. Such devices typically include a processor, computing device, or controller, such as a general-purpose central processing unit, a microcontroller, a reduced instruction set computer processor, an ASIC, a programmable logic circuit, an FPGA, a digital signal processor, and/or any other circuit or processing device capable of executing the functions described herein.

The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein.

The data processing functions disclosed herein may also be practiced in distributed computing environments, in which tasks or modules are performed via remote processing devices that are linked through a communication network such as those enabled via datalink by the airplane communication systems. In a distributed computing environment, program modules or subroutines may be located in both local and remote memory storage devices. The processed data may be stored or distributed on non-transitory tangible computer-readable storage media, including magnetic or optically readable computer disks (e.g., removable disks), as well as distributed electronically over networks, such networks including ground-based and satellite-based components of navigation systems. Information handled in accordance with technical aspects disclose herein may be presented on displays or display media, for example, CRT screens, LCD screens, head-up displays, touch screens, or other suitable display devices.

While systems, methods, and devices for enabling GLS capability onboard an ILS-capable airplane have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. A system for providing GLS-based position guidance to an airplane pilot during a runway approach, the system comprising:
    a Ground Based Augmentation System Landing System (GLS) interface device comprising a processor;
    a GLS-capable multi-mode receiver communicatively coupled to the GLS interface device, wherein the GLS-capable multi-mode receiver is configured to output Instrument Landing System (ILS) deviation data words containing ILS deviation data and an ILS data type identifier in an ILS mode and output GLS deviation data words containing GLS deviation data and a GLS data type identifier in a GLS mode;
    an ILS-capable flight management system communicatively coupled to the GLS interface device; and
    a display device communicatively coupled to the GLS interface device,
    wherein the processor of the GLS interface device is configured in a GLS mode to change the GLS data type identifier in GLS deviation data words received from the GLS-capable multi-mode receiver to be the ILS data type identifier.

2. The system as recited in claim 1, wherein the processor of the GLS interface device is further configured to output GLS deviation data words identified by the ILS data type identifier.

3. The system as recited in claim 2, wherein the display device is configured to display visual guidance in an ILS deviation format based on GLS deviation data contained in GLS deviation data words identified by the ILS data type identifier received from the GLS interface device.

4. The system as recited in claim 2, further comprising an autopilot communicatively coupled to the GLS interface device and configured to process GLS deviation data contained in received GLS deviation data words identified by the ILS data type identifier as if the GLS deviation data were ILS deviation data during an automated landing procedure.

5. The system as recited in claim 2, further comprising a Distance Measuring Equipment (DME) communicatively coupled to the GLS interface device and configured to output DME distance data words containing DME distance data derived by timing a propagation delay of radio signals and a DME data type identifier, wherein the processor of the GLS interface device is further configured in the GLS mode to change a GLS data type identifier in GLS distance data words received from the GLS-capable multi-mode receiver to be the DME data type identifier.

6. The system as recited in claim 1, wherein the GLS interface device comprises:
    first and second input terminals;
    first through fourth operating contact terminals;
    a transceiver connected to the first and second operating terminals;
    a bridge wire that connects the third operating contact terminal to the fourth operating contact terminal;
    a first relay connected to the first input terminal and having a first switch state in which the first relay connects the first input terminal to the first operating contact terminal and a second switch state in which the first relay connects the first input terminal to the third operating contact terminal; and
    a second relay connected to the second input terminal and having a first switch state in which the second relay connects the second input terminal to the second operating contact terminal and a second switch state in which the second relay connects the second input terminal to the fourth operating contact terminal,
    wherein the processor is connected to and configured to control the first and second relays to connect the first and second input terminals to the first and second operating terminals respectively in a GLS mode and to connect the first and second input terminals to the third and fourth operating terminals respectively in an ILS mode.

7. The system as recited in claim 6, wherein one of the first and second input terminals is connected to the flight management system and another of the first and second input terminals is connected to the GLS-capable multi-mode receiver.

8. The system as recited in claim 6, further comprising an autopilot communicatively coupled to the GLS interface device, wherein the first input terminal is connected to the GLS-capable multi-mode receiver and the second input terminal is connected to the autopilot.

9. The system as recited in claim 6, further comprising a DME communicatively coupled to the GLS interface device, wherein the first input terminal is connected to the DME and the second input terminal is connected to the display device.

10. The system as recited in claim 6, wherein the first input terminal is connected to the GLS-capable multi-mode receiver and the second input terminal is connected to the display device.

11. A method for retrofitting an ILS-capable airplane with GLS capability, comprising:
    disconnecting an ILS-capable multi-mode receiver from an ILS-capable avionics system onboard an airplane;
    connecting a GLS interface device to the ILS-capable avionics system; and
    connecting a GLS-capable multi-mode receiver to the GLS interface device,
    wherein a processor of the GLS interface device is configured in a GLS mode to change a GLS data type identifier in GLS deviation data words received from a GLS-capable multi-mode receiver to be an ILS data type identifier.

12. The method as recited in claim 11, further comprising connecting a DME to the GLS interface device, wherein the processor of the GLS interface device is further configured in the GLS mode to change a GLS data type identifier in GLS distance data words received from a GLS-capable multi-mode receiver to be a DME data type identifier.

13. A method for providing GLS-based position guidance to an airplane pilot during a runway approach, the method comprising:

(a) using the GLS to measure a deviation of a position of the airplane relative to a runway during the approach;

(b) outputting GLS deviation data words containing a GLS data type identifier and GLS deviation data representing a GLS-measured deviation;

(c) changing the GLS data type identifier in the GLS deviation data words to be an ILS data type identifier; and (d) sending the GLS deviation data words containing the ILS data type identifier to an ILS-capable avionics system.

14. The method as recited in claim 13, wherein step (b) is performed by a GLS-capable multi-mode receiver and steps (c) and (d) are performed by a GLS interface device installed between the GLS-capable multi-mode receiver and the ILS-capable avionics system.

15. The method as recited in claim 14, further comprising:

(e) outputting GLS distance data words containing a GLS data type identifier and GLS distance data representing a GLS-measured distance; and (f) changing the GLS data type identifier in the GLS distance data words to be a DME data type identifier, wherein step (e) is performed by the GLS-capable multi-mode receiver and step (f) is performed by the GLS interface device.

16. The method as recited in claim 13, further comprising displaying visual guidance in an ILS deviation format based on the GLS deviation data contained in the GLS deviation data words identified by the ILS data type identifier.

17. A GLS interface device comprising:

first and second input terminals;

first through fourth operating contact terminals;

a transceiver connected to the first and second operating terminals;

a bridge wire that connects the third operating contact terminal to the fourth operating contact terminal;

a first relay connected to the first input terminal and having a first switch state in which the first relay connects the first input terminal to the first operating contact terminal and a second switch state in which the first relay connects the first input terminal to the third operating contact terminal; and a second relay connected to the second input terminal and having a first switch state in which the second relay connects the second input terminal to the second operating contact terminal and a second switch state in which the second relay connects the second input terminal to the fourth operating contact terminal, wherein the processor is connected to and configured to control the first and second relays to connect the first and second input terminals to the first and second operating terminals respectively in a GLS mode and to connect the first and second input terminals to the third and fourth operating terminals respectively in an ILS mode.

18. The GLS interface device as recited in claim 17, wherein the processor is further connected to the transceiver and further configured to replace data payload identifiers in avionics data received from the transceiver as appropriate in both directions in the GLS mode and not replace the data payload identifiers in the avionics data in the ILS mode.

19. The GLS interface device as recited in claim 18, wherein the processor of the GLS interface device is configured in a GLS mode to receive a GLS deviation data word and change a GLS data type identifier in the GLS deviation data word to be an ILS data type identifier.

20. The GLS interface device as recited in claim 18, wherein the processor of the GLS interface device is configured in a GLS mode to receive a GLS distance data word and change a GLS data type identifier in the GLS distance data word to be a DME data type identifier.

* * * * *